United States Patent Office 3,382,254
Patented May 7, 1968

3,382,254
METHOD OF MAKING TETRABROMOPHTHALIC ACID ANHYDRIDE
Herbert Jenkner, Cologne-Deutz, Otto Rabe, Cologne-Hohenberg, and Robert Strang, Cologne-Buchheim, Germany, assignors to Chemische Fabrik Kalk G.m.b.H., Cologne-Kalk, Germany
No Drawing. Filed Apr. 22, 1966, Ser. No. 544,363
Claims priority, application Germany, May 6, 1965, C 35,778
2 Claims. (Cl. 260—346.3)

ABSTRACT OF THE DISCLOSURE

Method of producing tetrabromophthalic acid anhydride by reacting bromine with phthalic acid anhydride in a molar ratio of 2.01 to 2.1 in a reaction mixture containing a halogenation catalyst and 4.4 to 4.8 moles of $SO_3$ per mole of phthalic acid anhydride in the form of 50 to 80% oleum wherein at least the first 80% and preferably 85 to 90% of the total bromine is slowly added to the reaction mixture while it is maintained at a temperature of 80 to 90° C. and the remainder being added after the reaction mixture has been heated to 100 to 110° C., then heating the reaction mixture to 120 to 150° C. to distill off the excess $SO_3$ and bromine, cooling the distillation residue to room temperature and separating off the tetrabromophthalic acid anhydride which crystallized out.

---

This invention concerns a method of making tetrabromophthalic acid anhydride.

It is a known fact that bromine derivatives of substituted aromatic hydrocarbons with 4 bromine atoms in the molecule can be obtained by reaction of the hydrocarbon concerned with bromine in sulphuric acid containing sulphur trioxide (oleum). According to a relatively recent proposal, the substituted hydrocarbon, such as for example phthalic acid anhydride, can be introduced at a temperature of 20 to 90° C. into an amount of sulphuric acid at least sufficient for its monosulphonation and containing an amount of sulphur trioxide at least sufficient for oxidation of the hydrogen bromide produced. 20 to 30% of the necessary amount of bromine is added to the reaction mixture at the selected starting temperature of 20 to 90° C. The remainder of the necessary amount of bromine is added to the reaction mixture while the reaction temperature is gradually increased to a value between 50 and 150° C. Particularly pure products can be obtained if, furthermore, a 10 to 50% bromine excess is introduced into the reaction mixture.

When this method is applied to the manufacture of tetrabromophthalic acid anhydride, however, undesired side-reactions cannot be avoided and arise particularly from the use of the greater excess of bromine necessary in this case. These side-reactions lead not only to losses of yield but even to products which contaminate the tetrabromophthalic acid anhydride and have to be separated therefrom in auxiliary operations. Furthermore, even when a greater bromine excess is used, the reaction times, at 30 to 40 hours, are too long for large-scale industrial application of this method to the production of tetrabromophthalic acid anhydride.

The invention described hereinafter arose from the problem of avoiding these disadvantages.

A method was found of making tetrabromophthalic acid anhydride by reacting bromine with phthalic acid anhydride in a molar ratio of 2.01 to 2.1 at temperatures of 80 to 110° C., the bromine being introduced into a reaction mixture which, in addition to phthalic acid anhydride and a small quantity of halogenating catalyst, contained 4.4 to 4.8 moles sulphur trioxide in the form of 50 to 80% oleum, for every mole of phthalic acid anhydride. Thus, at least 80% and preferably 85 to 90% of the bromine is introduced into the mixture of phthalic acid anhydride, oleum and halogenating catalysts, maintained at a temperature of 80 to 90° C., the remainder of the bromine being added after the reaction mixture has been heated to a temperature of 100 to 110° C., and, after completion of the addition of bromine, the excess sulphur trioxide and bromine are distilled off from the reaction mixture, the latter being heated to temperatures of 135 to 145° C., so that the crystallised out tetrabromophthalic acid anhydride can be separated from the distillation residue cooled to room temperature, in a per se known manner.

In order to carry out the method according to the invention, phthalic acid anhydride is first introduced into oleum containing 50 to 80%-weight sulphur trioxide in solution. For every mole of phthalic acid anhydride, the mixture formed in this way should contain 4.4 to 4.8 moles free sulphur trioxide. Small amounts of halogenating catalyst such as for example iron, aluminum, iodine or other substances known for this purpose are added to the mixture obtained.

The amount of bromine to be introduced in toto into the mixture should be approximately 2.01 to 2.1 moles bromine per mole of phthalic acid anhydride. Of this, at least 80% and preferably 85 to 90% is added to the mixture, which is heated to a temperature of 80 to 90° C., the components of the reaction being briskly and thoroughly blended. During this addition of bromine, it is essential to avoid the temperature of the reaction mixture falling or rising to levels which are outside of the stated range because this would result in exaggerated losses of bromine and $SO_3$. The balance of the amount of bromine is similarly introduced into the reaction mixture under vigorous blending, once the said mixture has been heated to a temperature of 100 to 110° C.

When bromination has been completed, sulphur trioxide and the excess of bromine are distilled off from the reaction mixture, possibly at reduced pressure, the reaction mixture being heated to temperatures of 120 to 150° C. and preferably 135 to 145° C.

When the distillation residue is cooled, the tetrabromophthalic acid anhydride is crystallised out of the reaction mixture and is separated from the mother liquor. The tetrabromophthalic acid anhydride is then freed from catalyst by being washed with suitable liquids. Where iron catalysts are used, a suitable washing liquid is 50% sulphuric acid. The tetrabromophthalic acid anhydride can then be further cleaned by washing with water, and then dried.

The tetrabromophthalic acid anhydride produced in a high yield, with a bromine content of 68.6%-weight, is, for many industrial applications, of sufficient purity and, in practice, side reactions have not been detected when carrying out the method according to the invention.

Example 148 parts by weight phthalic acid anhydride are mixed with 0.5 part by weight powdered iron, 0.1 part by weight iodine and 540 parts by weight oleum (65%-weight $SO_3$). After the addition of 140 parts by weight of a mixture which, in a preceding operation, was added to the washing mixture as a washing liquid, the bromination mixture is heated to a temperature of 90° C. and maintained at that temperature while 330 parts by weight bromine are slowly added, the mixture being stirred vigorously, and then the temperature being increased to 105° C. before the last 40 parts by weight bromine are added.

When all the bromine has been added, the excess bromine and sulphur trioxide are distilled off from the bromination mixture, the reaction mixture being heated to a temperature of 140° C. As the reaction mixture is cooled to room temperature, the tetrabromophthalic acid anhydride is crystallised out. It is separated from the mother liquor and is washed with 50% sulphuric acid to free it from iron, and then washed again with water until it is free from sulphates. After drying, 436 parts by weight tetrabromophthalic acid anhydride are obtained, with a bromine content of 68.6%-weight. The melting point of this product is approximately 270° C.

We claim:

1. A method of producing tetrabromophthalic acid anhydride by reacting bromine with phthalic acid anhydride in a molar ratio of 2.01 to 2.1 at atmospheric pressure in contact with oleum which comprises slowly introducing 80 to 90% of the bromine into a reaction mixture containing the phthalic acid anhydride, a small amount of a halogenation catalyst selected from the group consisting of iron, aluminum and iodine and 4.4 to 4.8 moles of sulfur trioxide per mole of phthalic acid anhydride in the form of 50 to 80% oleum while it is maintained at a temperature of 80 to 90° C., then heating the reaction mixture to 100 to 110° C. and slowly introducing the remainder of the bromine, after completion of the addition of the bromine, heating the reaction mixture to 120 to 150° C. to distill off the excess sulfur trioxide and bromine, cooling the distillation residue to crystallize out the tetrabromophthalic acid anhydride and separating off the crystallized tetrabromophthalic acid anhydride.

2. The process of claim 1 in which 85 to 90% of the bromine is added while the reaction mixture is maintained at 80 to 90° C. and in which after completion of the bromine addition the reaction mixture is heated to 135 to 145° C. to distill off the excess sulfur trioxide.

References Cited

FOREIGN PATENTS 1,039,052  9/1958  Germany.

OTHER REFERENCES

Pratt et al.: J. Am. Chem. Soc., vol. 40 (1918), p. 1416 QD1A5.

NICHOLAS S. RIZZO, *Primary Examiner.*

ALTON D. ROLLINS, *Examiner.*

B. I. DENTZ, *Assistant Examiner.*